United States Patent
Culkin

(10) Patent No.: US 8,259,006 B2
(45) Date of Patent: Sep. 4, 2012

(54) INTERLEAVED BEAM COHERENT RADAR APPARATUS AND PROCESSING METHOD

(75) Inventor: Daniel R. Culkin, Cazenovia, NY (US)

(73) Assignee: SRC Inc., North Syracuse, NY (US)

(*) Notice: Subject to any disclaimer, the term of this patent is extended or adjusted under 35 U.S.C. 154(b) by 289 days.

(21) Appl. No.: 12/715,480

(22) Filed: Mar. 2, 2010

(65) Prior Publication Data

US 2011/0215962 A1 Sep. 8, 2011

(51) Int. Cl.
*G01S 13/42* (2006.01)
(52) U.S. Cl. .................. 342/195; 342/107; 342/115
(58) Field of Classification Search .............. 342/195, 342/107–116
See application file for complete search history.

(56) References Cited

U.S. PATENT DOCUMENTS

| | | | | |
|---|---|---|---|---|
| 3,274,594 A | * | 9/1966 | Page | 342/204 |
| 3,408,647 A | * | 10/1968 | Dynan et al. | 342/161 |
| 3,441,930 A | * | 4/1969 | Mercier et al. | 342/107 |
| 3,858,209 A | * | 12/1974 | Zulch | 342/109 |
| 5,093,649 A | * | 3/1992 | Johnson | 342/157 |
| 5,128,683 A | | 7/1992 | Freedman et al. | |
| 5,132,688 A | | 7/1992 | Shima et al. | |
| 5,173,706 A | | 12/1992 | Urkowitz | |
| 5,262,785 A | * | 11/1993 | Silverstein et al. | 342/162 |
| 6,952,440 B1 | | 10/2005 | Underbrink | |
| 7,382,310 B1 | | 6/2008 | Piesinger | |
| 7,646,326 B2 | * | 1/2010 | Antonik et al. | 342/25 B |
| 2005/0253748 A1 | | 11/2005 | Brookner | |
| 2010/0328157 A1 | * | 12/2010 | Culkin et al. | 342/372 |
| 2011/0205120 A1 | * | 8/2011 | Culkin | 342/374 |
| 2011/0215962 A1 | * | 9/2011 | Culkin | 342/99 |

\* cited by examiner

*Primary Examiner* — John B Sotomayor
(74) *Attorney, Agent, or Firm* — George R. McGuire; Bond Schoeneck & King

(57) ABSTRACT

A method for interleaved pulsed-Doppler processing. Radar energy management and associated processing techniques take advantage of spatial degrees of freedom available on modern, short range, wide angle, volume search ESA radar systems. The method creates an advantage in Doppler resolution when compared to currently utilized Doppler processing techniques. An Electronically Scanned Array (ESA) radar system includes one or more processors that may be programmed to read and execute instructional commands including transmit a plurality of synchronized, coherent pulsed transmit beams having substantially repeatable gain and phase pattern characteristics; electronically steer the plurality of transmit beams in a respective, sequential plurality of spatially diverse directions in a temporally-interleaved manner; sequentially collect a respective plurality of receive beams in a respective plurality of time vs. range buffers; determine a range-Doppler output at a selected, common receive position in each of the plurality of buffers.

5 Claims, 4 Drawing Sheets

INTERLEAVED BEAM COHERENT RADAR APPARATUS AND PROCESSING METHOD

RELATED APPLICATION DATA

N/A.

GOVERNMENT SPONSORSHIP

N/A.

BACKGROUND

1. Field of Invention

Embodiments of the invention generally pertain to electronically-steered pulse-Doppler radar systems and methods. More particularly, embodiments on the invention pertain to a method of radar energy management and Doppler processing. Embodiments are further directed to a method for artificially increasing the coherent integration time (Doppler resolution) for a given receive position without penalty to the overall radar timeline.

2. Description of Related Art

Doppler processing in radar systems is well known. Referring to FIG. 1, in a typical modern pulsed Doppler radar, a set number of multiple pulses are transmitted at a constant "pulse repetition interval" (PRI). The total number of pulses to be processed at a time multiplied by the PRI is typically referred to as the "coherent period of integration" (CPI). The radar processor stores received complex signals (Range samples) as a function of time (sometimes referred to as "fast time," corresponding to samples in range of energy returned from a single pulse) from each successive individual pulse (sometimes referred to as "slow time," with the value corresponding to pulse or pulse repetition interval (PRI) number within a given CPI). Using data corresponding to common points in range (i.e., a "fast time" sample of the same range) of the PRIs within a CPI, a Fourier transform is performed across the data points for all of the PRIs within a CPI. This calculation transforms phase change rate across the PRIs at a common range into Doppler. When performed for all range samples, the result is a two dimensional array of complex values that correspond to radar Range and Doppler.

The "Doppler resolution" is often described as the ability to separate two sources of response at two different Dopplers at the same range. For pulsed-Doppler radars, the Doppler resolution is a function of radar frequency and the CPI.

"Unambiguous Doppler" corresponds to the breadth of range rate that the radar can measure a target unambiguously, i.e. without aliasing. The unambiguous Doppler is determined by the radar frequency and the radar "pulse repetition frequency" (PRF). The PRF can be represented as the inverse of the PRI duration. As such, the unambiguous Doppler divided by the number of PRIs within a CPI results in a value that approximates the Doppler resolution capability. For example, in the case that the frequency and CPI duration result in an unambiguous Doppler capability covering 0 meters per second (m/s) to 320 m/s, and the CPI contains 32 pulses, the resulting Doppler resolution can be approximated to be 10 m/s.

Classical pulse-Doppler type radar systems were mechanically scanned, and utilized simple processing. Subsequent ESA (Electronically Scanned Array) radar systems were typically used for long range operation. Both of these types of radar systems utilized consecutive pulses at a common angle location to create a CPI and perform Doppler processing. With the advent of modern, low cost, high-transmit duty cycle, short range ESA radar systems that are capable of precision radar beam pointing at extremely rapid rates, such as the AN/TPQ-48 radar system developed by SRC, Inc., additional degrees of freedom in managing radar energy have required new techniques in Doppler processing.

SUMMARY

An embodiment of the invention is directed to a method for Doppler processing. A non-limiting aspect of the invention is directed to a method for managing Doppler resolution for short duration CPIs in radar systems through an interleaved coherent beam pointing with a corresponding Doppler processing technique. Another non-limiting aspect of the invention is directed to a method for efficient energy management for radar systems, enabling the use of short CPI waveform sets that would otherwise be ineffective due to possessing a Doppler resolution not sufficient for target detection. This increases the time available for the use of long pulsewidths in conjunction with waveform sets tuned to maximize radar detection range.

More specifically, an embodiment of the invention is directed to a method for pulse-Doppler radar including the steps of providing a plurality of synchronized, coherent, pulsed transmit beams having substantially repeatable gain and phase pattern characteristics; electronically steering the plurality of transmit beams in a respective, sequential plurality of spatially diverse directions in a temporally-interleaved manner; sequentially collecting a respective plurality of receive beams in a respective plurality of time vs. range buffers; repeating the above steps for a desired number of pulse repetition intervals to achieve desired range-Doppler resolution characteristics; and determining a range-Doppler output at a selected, common receive position in each of the plurality of buffers.

An embodiment of the invention is directed to an Electronically Scanned Array (ESA) radar system. The embodied system includes one or more processors that may be programmed to read and execute instructional commands and operational functions. These executable commands, instructions, and/or functions include one or more of the following: transmit a plurality of synchronized, coherent pulsed transmit beams having substantially repeatable gain and phase pattern characteristics; electronically steer the plurality of transmit beams in a respective, sequential plurality of spatially diverse directions in a temporally-interleaved manner; sequentially collect a respective plurality of receive beams in a respective plurality of time vs. range buffers; determine a range-Doppler output at a selected, common receive position in each of the plurality of buffers. The aforementioned executable instructional commands may be provided in any of a variety of well known, non-transitory computer-readable media capable of storing said executable instructions and being read by the one or more processors. By way of example, and not limitation, non-transitory computer readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the one or more processors.

Thus the embodiments and aspects of the present invention provide techniques for enhancing modern ESA radar system capabilities, as well as a novel ESA radar system. The apparatus and techniques take advantage of precision scan and time sampling technology, and utilizing new degrees of freedom in radar energy management by allowing for radar pulses in a CPI to be non-consecutive in angular direction, having the radar and processor perform multiple CPIs in parallel, and utilizing the associated increase in CPI (and associated decrease in unambiguous Doppler coverage) to create a performance advantage in Doppler resolution when compared to previous techniques.

In more general terms, the embodied invention provides a way to artificially increase the coherent integration time for a given position without penalty to the energy timeline by transmitting in spatially diverse directions in an interleaved fashion. Alternatively, the embodied invention provides a way to reduce Doppler cell size for short-range waveforms without sacrificing timeline.

Additional features and advantages of the invention will be set forth in the detailed description which follows, and in part will be readily apparent to those skilled in the art from that description or recognized by practicing the invention as described herein, including the claims as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention and are incorporated in and constitute a part of this specification. The drawings illustrate various embodiments of the invention and together with the description serve to explain the principles and operation of the invention.

DETAILED DESCRIPTION OF EMBODIMENTS OF THE INVENTION

Figure 1:
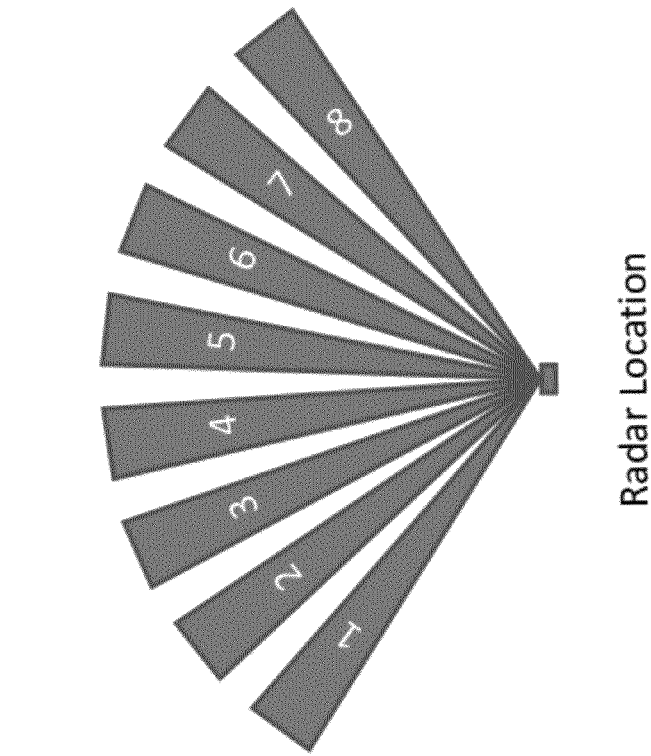
FIG. 1 shows the sample radar beam position and sequencing associated with the description in Example 1 for a traditional pulsed Doppler radar configuration.

For a typical pulsed-Doppler phased array radar system, an arbitrary or pre-defined waveform is generated, amplified, and radiated from the radar antenna. The characteristics of the energy that is radiated from the antenna elements can be manipulated in amplitude and relative phase by modern antenna technologies that are well known. Through the controlled phasing of antenna elements, the transmitted energy can be directed in a desired spatial direction. Similarly, energy received by the antenna can be manipulated in the same way. The direction that the phased array directs the energy in is typically referred to as the radar's beam position. The beam width of the radar system is a function of the frequency of the radar, the size of the antenna, and the amplitude settings of the individual antenna elements. (In some applications, element phasing is used to "spoil" the radar beamwidth, which widens the beamwidth but incurs radar signal loss.)

Typical pulsed Doppler radar systems will direct the radar beam in a given direction, and will transmit and receive multiple pulses in that direction with precision timing. The radar will then direct the beam to the next desired position, and again will transmit/receive multiple pulses in that direction.

On receive, the signal from the antenna may be down-converted to a lower frequency, and the resultant signal may be de-modulated or "pulse compressed" with techniques that are well known. Digitization of this signal may take place at any point in this process. While the descriptions associated with this invention assume digital data streams, comparable processes utilizing analog signals will yield the same advantages.

Following demodulation of the received signal, typical pulsed Doppler radars will store digitized samples of the signal for what is sometimes referred to as "corner turn processing". For a single pulse, digital samples are measured at set time intervals, and correspond to range from the radar antenna. This process is repeated for multiple pulses, with the set of digital samples corresponding to ranges identical to that of the previous pulses.

For a given CPI, a set number of pulses are scheduled for processing. Typically, at the conclusion of the collection of received samples for the CPI, a Fourier transform calculation is performed on the samples of common range. The output of this calculation is a complex value for which the amplitude corresponds to the summation of signal received at a corresponding range rate, or Doppler. In performing this function, radars will typically utilize a Fast Fourier Transform (FFT) calculation for efficiency, which will generate the same number of phase rate coefficients in the calculation as there are pulses in the CPI.

The Doppler resolution is usually defined as the ability to separate targets and/or clutter that are at two different Dopplers and at a common range. The exact Doppler resolution of a radar system is dependent on many factors, but the fundamental properties that determine the Doppler resolution are the size of the CPI in time and the frequency of the radar. An approximation of the Doppler resolution can be defined by the following equation:

$$\text{Doppler Resolution} = \frac{c}{2 \times freq \times CPI},$$

where c is the speed of the radar radiation, freq is the center frequency of the radar waveform, and CPI is the duration of the coherent period of integration.

Unambiguous Doppler is defined as the limitation of the radar to measure the Doppler of a target without aliasing. The unambiguous Doppler is a function of radar frequency and the PRI length of the radar, and can be described by the following equation:

$$\text{Unambiguous Doppler} = \frac{c}{4 \times freq \times PRI},$$

where PRI is the pulse repetition interval.

Embodiments of the invention utilize additional degrees of freedom available on modern radars for the purpose of manipulation of Doppler resolution and unambiguous Doppler for target detection and/or radar timeline improvements. The methods described herein advantageously exploit the ability of modern radar systems to change the spatial direction of consecutive radar pulses and return to a previous spatial direction with precision repeatability, as well as modern computational capabilities for the simultaneous Doppler processing of multiple beams.

Presenting the embodied invention, more than one beam position is utilized at a time, with energy transmitted in an interleaved fashion, and data processed in an interleaved manner, taking advantage of the additional total duration that each beam position is active while assuming no net loss in radar timeline. As such, both the effective CPI and the effective PRI for a given beam position will increase as a multiple of the number of beams that are simultaneously being utilized. The Doppler resolution and the unambiguous Doppler can now be approximated as:

$$\text{Doppler Resolution} = \frac{c}{2 \times freq \times CPI \times \#beams}, \text{ and}$$

$$\text{Unambiguous Doppler} = \frac{c}{4 \times freq \times PRI \times \#beams}$$

where #beams is defined as the number of beam positions being simultaneously utilized.

For a radar system performing a volume search, this technique will impact the Doppler resolution and the unambiguous Doppler associated with the target toward a reduced unambiguous Doppler, and a Doppler resolution that allows for the separation of targets or clutter that are closer in Doppler at a common range.

The following Example 1 illustrates Doppler resolution improvements over conventional processing.

Example 1

Assume a radar system of center frequency 3 GHz, and a given beamwidth "D" in both elevation and azimuth. The requirement of the radar is to search 8 beam positions for a target, and to search those 8 beam positions to a range of 2000 meters. A total timeline of approximately 0.004 seconds is allocated to search all 8 positions.

To meet this search criteria, a waveform PRI of 15 μsec (microseconds) is utilized, and 32 pulses integrated per CPI. This results in a CPI of 0.00048 seconds, and a total search time of 0.00384 seconds.

Associated with this waveform set, a classical radar (refer to FIG. 1) would direct the radar beam to position #1, pulse 32 times, then direct to position #2, pulse 32 times, and so on through position #8. The resulting characteristics are an unambiguous Doppler coverage of +/−1666.7 m/s, and an approximate Doppler resolution of 104.2 m/s. The instrumented range is approximately 2000 m, with range aliasing being well understood.

Figure 2:
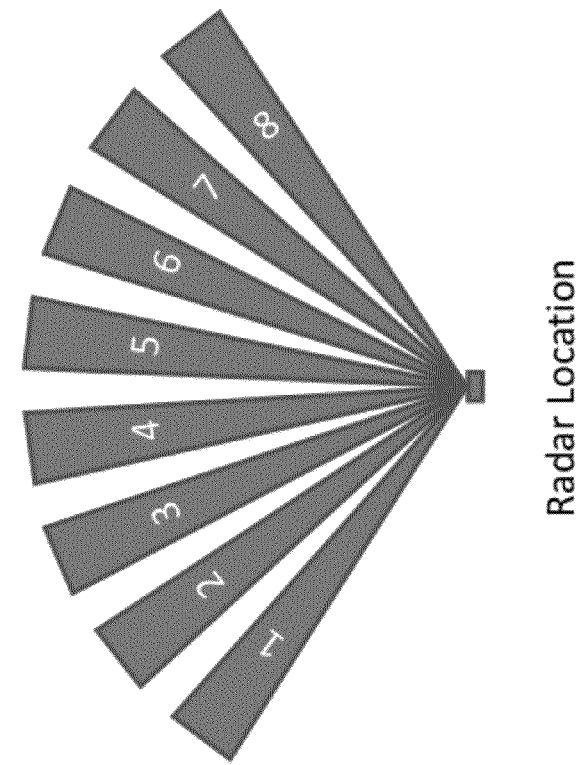
FIG. 2 shows the same radar beam positions and sequencing associated with the description in Example 1, according to a non-limiting, illustrative embodiment of the invention.

Associated with this waveform set, in accordance with an illustrative aspect of the present invention (refer to FIG. 2), the processing method would direct the radar beam to position #1, pulse one time, then direct to position #2, pulse 1 time, and so on for positions #'s 3-7, then direct to position #8, pulse 1 time, then redirect to position #1, pulse one time, etc., until each beam position had a total of 32 pulses. The resulting characteristics are an unambiguous Doppler coverage of +/−208.3 m/s, and an approximate Doppler resolution of 13.0 m/s. The instrumented range remains unchanged at approximately 2000 m, and range aliasing is modified (with respect to transmit sidelobe power associated with the transmit of other beam positions, and with respect to well understood effects with an effective PRI that is eight times greater than the case of the classical implementation).

Thus according to the foregoing example, should the radar usage have included targets that require Doppler resolution of less than 104.2 m/s, there is an advantage to the embodied invention for the functionality of the radar.

Example 1a

In reference to the case of Example 1, a classical radar technique to achieve the Doppler resolution required would be to increase the CPI by a factor of 8, through either, or combination of, increasing the PRI length or the number of pulses. In either case, to achieve the same Doppler resolution, the radar timeline would require an increase by a factor of 8.

Example 1b

In reference to the case of Example 1, an additional classical radar technique to achieve the Doppler resolution required would be to transmit a "spoiled" transmit beam that is wider than the given beamwidth "D" to place transmit energy on all 8 beam positions. This requires the assumption that all 8 beam positions are not too far apart and as such can be covered with a single spoiled transmit beam. The requirement to achieve the equivalent Doppler resolution as the instant embodied invention will require an additional 8 radar receiver channel sets, the capability to steer receive beam sets to 8 places simultaneously, and the equivalent processing of the instant embodied invention. In addition, it should be noted that spoiling a transmit beam to widen it will result in the loss of transmit energy. As such, to achieve the equivalent signal-to-noise ratio, the CPIs of the 8 simultaneous receive channel sets would have to be lengthened, and hence require additional radar timeline as compared to the instant embodied invention.

The following Example 2 illustrates radar timeline improvement in the presence of Doppler resolution requirements.

Example 2

Assume a radar system of center frequency 3 GHz, and a given beamwidth "D" in both elevation and azimuth. The radar requires 128 pulses of 8 μs transmit pulses at a single beam location to achieve the minimum target detection range (unambiguous) of 9,300 m. The radar is limited to a 10% transmit duty cycle.

The radar requirements include a need to provide continuous coverage from 400 m through 9300 m, with a Doppler resolution of less than 6 m/s. The required maximum target unambiguous Doppler is 300 m/s. The required search volume for this target requires 20 beam positions in disparate locations.

Assuming that disparate beam positions prevent transmit beam spoiling, a single beam position CPI will have to be approximately 0.0071 seconds in order to achieve the required Doppler resolution. In order to meet the minimum detection range requirement, the pulse width of at least one waveform set for each beam position will have to be 2 μs or less.

Solution #1 (classical)—In a single waveform set, the requirements can be achieved utilizing a 2 μs pulse, a PRI of 65 μs, 512 pulses integrated, resulting in the desired requirements at an update rate of 0.67 seconds.

Solution #2 (classical)—Requires the use of two waveform sets. Set #1 utilizes a 2 μs pulse, 56 μs PRI, and 128 pulses integrated, resulting in a target detection range of 6800 m. Set #2 uses an 8 μs pulse, 80 μs PRI, and 128 pulses integrated, resulted in the remaining target detection range required. The update rate for the entire range is 0.37 seconds, and all requirements are met.

Solution #3 (according to an illustrative aspect of the instant invention)—Requires the use of two waveform sets. Set #1 utilizes a 1 μs pulse, 14 μs PRI, and 128 pulses integrated, and is interleaved between four beam positions at a time, resulting in a target detection range of 5700 m. The unambiguous Doppler and Doppler resolution are identical to that in Set #1 in Solution #2. Set #2 uses an 8 μs pulse, 80 μs PRI, and 128 pulses integrated, resulting in the remaining target detection range required. The update for the entire range is 0.24 seconds, and all requirements are met. Thus radar energy usage is more efficient for this scenario.

The derivation of appropriate radar energy management for a given set of radar requirements requires the balance of many degrees of freedom, not all of which are captured in the foregoing examples. These examples are intended to demonstrate specific scenarios where the utilization of the additional degree of freedom associated with beam interleaved coherent processing and radar energy management allows for a significant performance improvement when compared to prior art and classical techniques.

Figure 3:
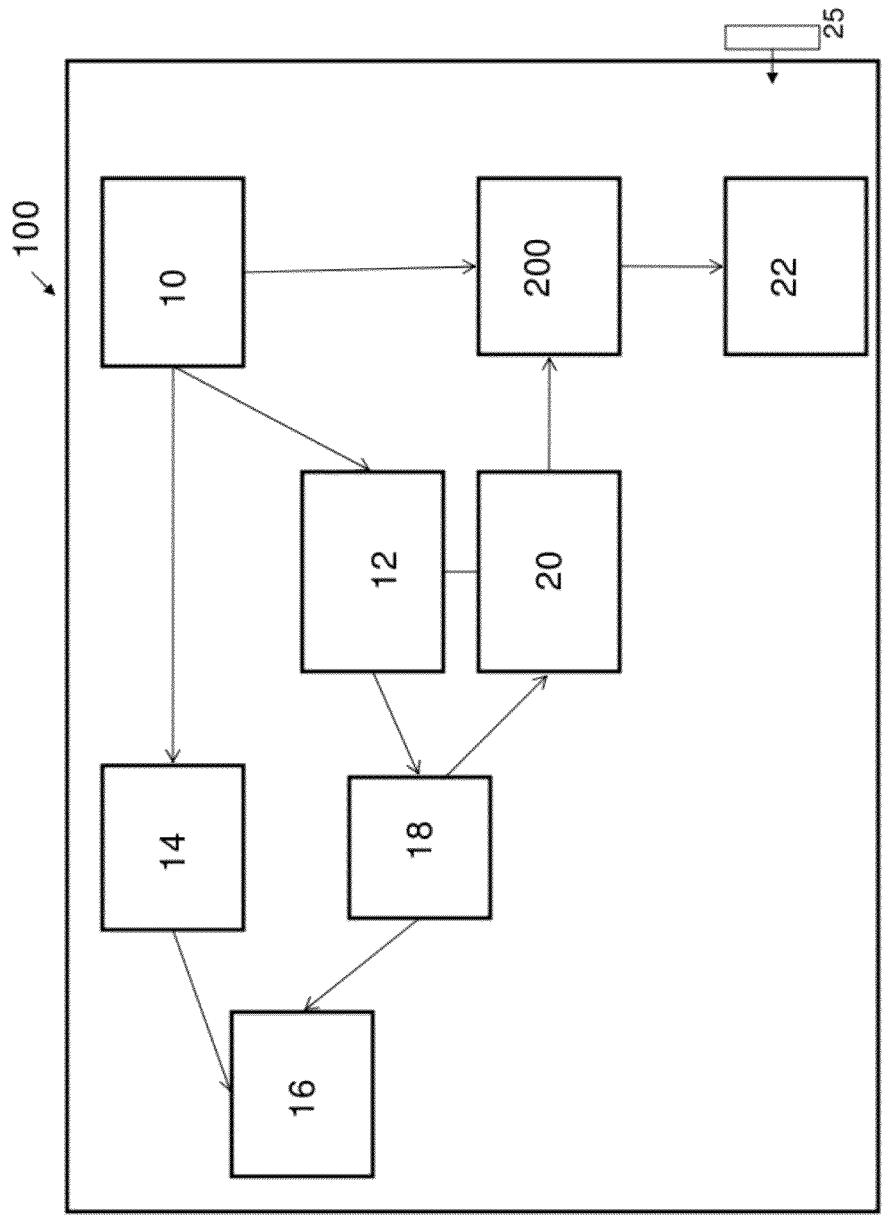
FIG. 3 is a block diagram illustrating an ESA radar system according to an exemplary, illustrative embodiment of the invention.
Figure 4:
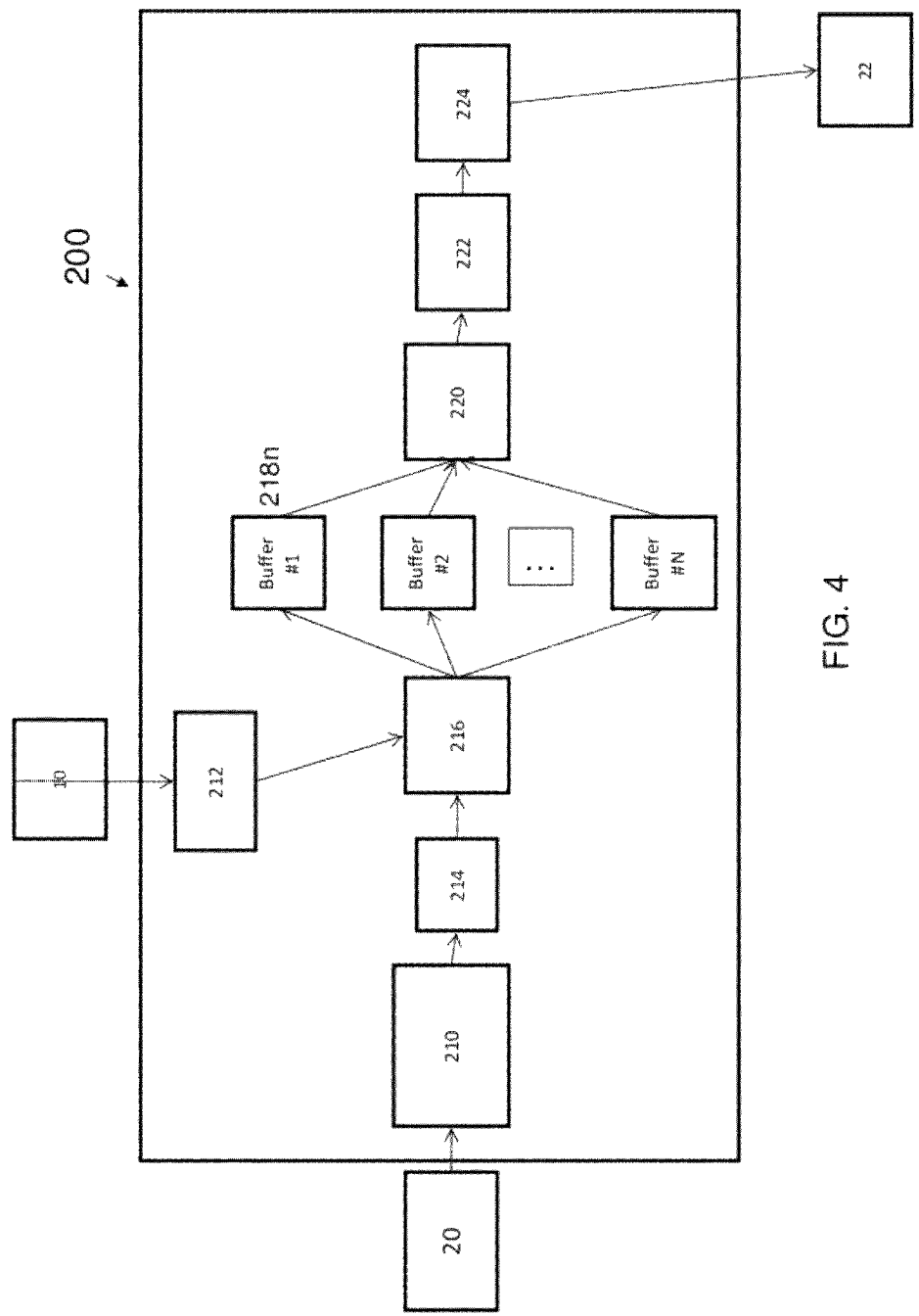
FIG. 4 is a block diagram showing the signal processor component of the radar system of FIG. 3.

FIG. 3 is a block diagram illustrating an ESA radar system 100 enabled to execute any and all of the following functions according to an embodiment of the invention: transmit a plurality of synchronized, coherent pulsed transmit beams having substantially repeatable gain and phase pattern characteristics; electronically steer the plurality of transmit beams in a respective, sequential plurality of spatially diverse directions in a temporally-interleaved manner; sequentially collect a respective plurality of receive beams in a respective plurality of time vs. range buffers (as shown within the signal processor 200 in FIG. 4); determine a range-Doppler output at a selected, common receive position in each of the plurality of buffers.

The non-limiting, illustrative radar system 100 shown in FIG. 3 includes a radar beam scheduler 10, a waveform generator 12, an antenna controller 14, an antenna with integrated transmit amplifier 16, a transmit/receive switch or circulator 18, an analog to digital convertor, a signal processor 200, and a detection/user interface processor 22. The non-limiting, illustrative signal processor sub system 200 within radar system 100 includes an input 210 for the digitized receive measurement, an input 212 for the radar scheduler, a digital filter 214, a beam position data router 216, multiple buffers 218$_n$ for data storage, a beam position selector 220, a corner-turn processor 222, and a detection and clutter processor 224.

The radar system is capable of receiving and reading an executable instruction contained in a non-transitory machine-readable medium 25 that includes an executable instruction set comprising: transmit a plurality of synchronized, coherent transmit beams having substantially repeatable gain and phase pattern characteristics; steer the plurality of transmit beams in a respective, sequential plurality of spatially diverse directions in a temporally-interleaved manner; sequentially collect a respective plurality of receive beams in a respective plurality of time vs. range buffers; and determine a range-Doppler output at a selected, common receive position in each of the plurality of buffers.

The use of the terms "a" and "an" and "the" and similar references in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. No language in the specification should be construed as indicating any non-claimed element as essential to the practice of the invention.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

I claim:

1. A method for pulse-Doppler radar, comprising:
    a) providing a plurality of synchronized, coherent pulsed transmit beams having substantially repeatable gain and phase pattern characteristics;
    b) electronically steering the plurality of transmit beams in a respective, sequential plurality of spatially diverse directions in a temporally-interleaved manner;
    c) sequentially collecting a respective plurality of receive beams in a respective plurality of time vs. range buffers;
    d) repeating steps (a-c) for a desired number of pulse repetition intervals to achieve desired range-Doppler resolution characteristics; and
    e) determining a range-Doppler output at a selected, common receive position in each of the plurality of buffers.

2. A method utilizing pulse-Doppler radar for artificially increasing a coherent integration time for a given position without penalty to an associated energy timeline, comprising transmitting a plurality of synchronized, coherent pulsed transmit beams having substantially repeatable gain and phase pattern characteristics in a respective, sequential plurality of spatially diverse directions in a temporally-interleaved manner, and sequentially collecting a respective plurality of receive beams in a respective plurality of time vs. range buffers.

3. The method of claim 2, further comprising increasing the number of transmitted beams.

4. An Electronically Scanned Array (ESA) radar system, comprising:
an antenna;
a transmitter;
a receiver;
at least one processor;
an input/output device;
a user interface component; and
at least one time vs. range buffer,
wherein the at least one processor has a configuration enabling it to execute a plurality of instructional commands provided on a non-transitory machine-readable medium that include transmitting a plurality of synchronized, coherent pulsed transmit beams having substantially repeatable gain and phase pattern characteristics; electronically steering the plurality of transmit beams in a respective, sequential plurality of spatially diverse directions in a temporally-interleaved manner; sequentially collecting a respective plurality of receive beams in a respective plurality of time vs. range buffers; and determining a range-Doppler output at a selected, common receive position in each of the plurality of buffers.

5. A non-transitory machine-readable medium that includes an executable instruction set comprising: transmit a plurality of synchronized, coherent transmit beams having substantially repeatable gain and phase pattern characteristics; steer the plurality of transmit beams in a respective, sequential plurality of spatially diverse directions in a temporally-interleaved manner; sequentially collect a respective plurality of receive beams in a respective plurality of time vs. range buffers; and determine a range-Doppler output at a selected, common receive position in each of the plurality of buffers.

* * * * *